Dec. 11, 1945. C. DE BRABANDER 2,390,572
DEVICE FOR TREATING FILAMENTARY MATERIAL
Filed April 10, 1942 2 Sheets-Sheet 1
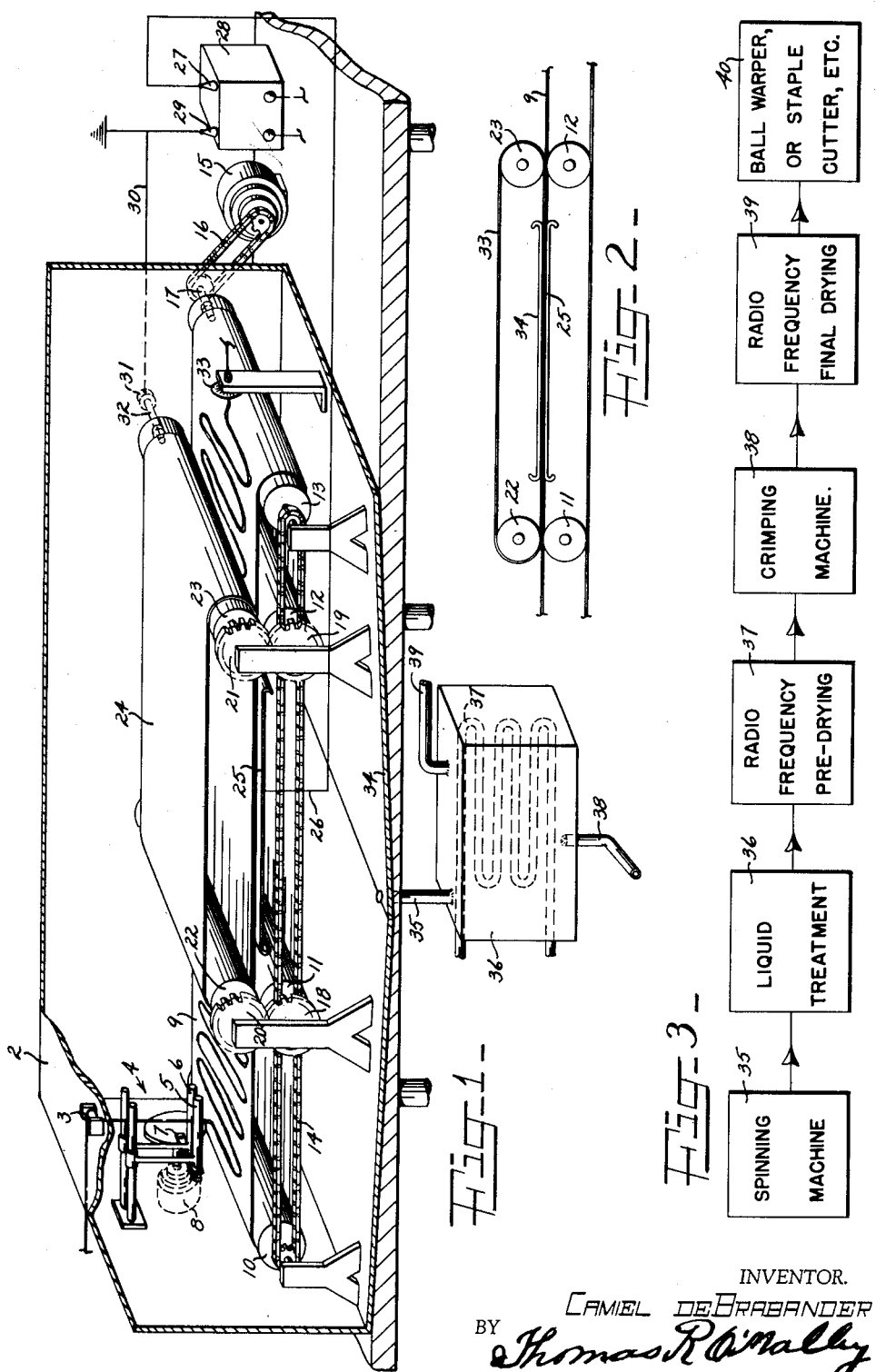

Dec. 11, 1945.   C. DE BRABANDER   2,390,572
DEVICE FOR TREATING FILAMENTARY MATERIAL
Filed April 10, 1942   2 Sheets-Sheet 2
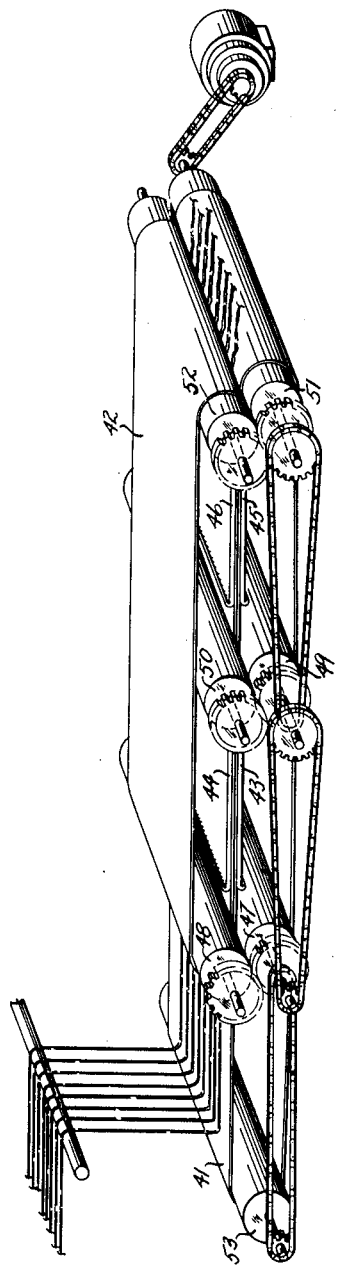
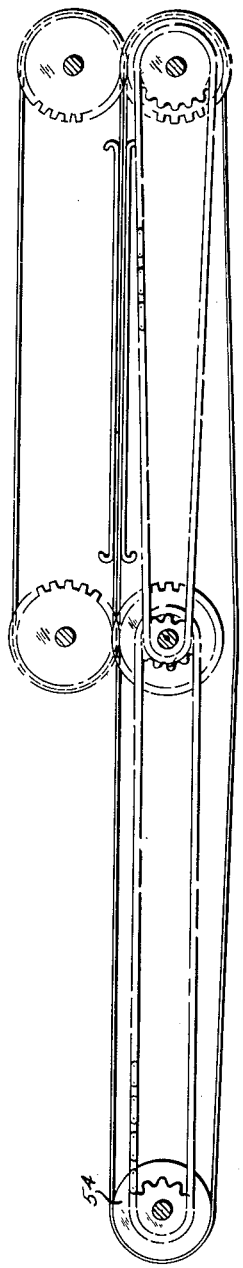
INVENTOR.
CAMIEL DE BRABANDER
BY Thomas R. O'Malley
ATTORNEY Patented Dec. 11, 1945

2,390,572

UNITED STATES PATENT OFFICE 2,390,572

DEVICE FOR TREATING FILAMENTARY MATERIAL

Camiel de Brabander, Newport, Del., assignor to American Viscose Corporation, Wilmington, Del., a corporation of Delaware Application April 10, 1942, Serial No. 438,420

15 Claims. (Cl. 19—66)

This invention relates to improvements in apparatus for heating filamentary material for various purposes, such as drying, partial drying, setting crimp, etc.

In the drawings, illustrative of the invention,

Figure 1 is a perspective view of one form of device for application of the invention with parts in cross-section, Figure 2 shows a modification, Figure 3 is a flow sheet showing one example of a process in which the invention, such as by means of the devices of Figures 1 and 2 may be employed.

Figure 4 shows a modification of the invention for crimping and setting the crimp, and Figure 5 shows a modification of the arrangement of Figure 4.

The device shown in Figure 1 is particularly adapted to the drying of tows of artificial filaments, such as of viscose. The device is housed within a suitable casing or chamber 2 which is substantially gas-tight, at least sufficiently so that a considerably reduced pressure may be readily maintained within the chamber. The tow or filamentary material enters the chamber through any suitable air-lock or air-sealing aperture 3, such as may be provided by a pair of tightly pressed rolls covered with sponge rubber, dense felt, or fur. It then proceeds to the piling mechanism 4 of any suitable form, such as the two guide rods 5 and 6 which are oscillated back and forth by means of a suitable eccentric mechanism 7. The motor 8 for this mechanism may be housed within the chamber 2 or its shaft may extend through an air-seal in the wall of the chamber. The tow is thus laid down in known manner upon the moving endless belt 9 which is of insulating material, preferably permeable in character, such as a woven glass fabric belt, a porous rubber belt, or the like. This belt is driven by and around the four rolls 10, 11, 12 and 13 which are connected and positively driven by a chain 14 through sprockets on the shafts of the rolls. A suitable motor 15 drives the last roll 13 by means of suitable sprockets and the chain 16. The shaft 17 of this roll may extend through a gas-tight seal in the wall of the chamber, or the motor may be enclosed within the chamber.

The two shafts of the intermediate rolls 11 and 12 are provided with gears 18 and 19 which mesh with gears 20 and 21 for driving two rolls 22 and 23 which are superposed over the lower two 11 and 12. A metallic foil or fabric belt 24, such as of a bronze ribbon, of copper gauze or the like, is driven by the two upper rolls 22 and 23 which press it into contact with the tow or filamentary material and the lower belt 9 which proceed beneath the metallic belt at the same rate of speed and in the same direction. Beneath the insulating belt 9 and between the two intermediate rolls 11 and 12, there is placed a metallic sheet or plate 25 which is electrically connected by means of the conductor 26 to one pole 27 of a high frequency electric current generator 28, such as a radio frequency oscillator. The other pole 29 of this oscillator is connected by the conductor 30 to the metallic belt 24 through a suitable brush or collar contact 31 with the shaft 32 of the roll 23 which must be conductive or have a conductive surface connected to the shaft. As the tow leaves the belt 9, it proceeds through a suitable funnel-shaped guide 33 through a suitable air-sealing opening within the wall of the casing to the next point of operation, which may be a twisting, winding, stapilizing, or staple fiber cutting mechanism.

The floor 34 of the chamber is preferably sloped, such as in the manner shown, a drain 35 of substantial diameter being provided at the lower point. This drain is connected to a condenser housing 36 provided with a condenser coil 37, a discharge pipe 38 being provided for the removal of any condensate which may be accomplished by means of a suitable pump attached thereto. A vacuum pump may be attached to a second pipe 39 connected to the condenser chamber as shown. If desired, a branch of this pipe 39 may be connected directly into the main chamber 2, preferably to the upper regions thereof, so that a vacuum may be more easily attained within the main chamber.

In operation of the device, a partial vacuum, preferably of substantial extent such as from 10 to 15 inches of mercury, is maintained within the main chamber in order to reduce the boiling point of water or liquid contained in the filamentary material to a point below the critical temperature (softening or decomposition) of the product. However, it is of even greater importance to remove the vapors as rapidly as possible from the permeable belts to reduce the possibility of flashover through the material at a given temperature and also to make possible the use of higher voltages in order to reduce the moisture content to a lower figure. The electrode 25 may be in direct contact with the belt 9 or just slightly therebelow. Preferably, it is pressed into contact therewith in order to reduce the distance between the metallic belt 24 and the lower electrode 25 and thereby reduce the voltage needed. The insulating belt 9 serves to prevent any possibility of direct conductive contact between the metallic foil belt 24 and the metallic electrode 25 should the tow be broken at any point or sufficiently separated so that the metallic foil belt could sag toward the metallic electrode therebeneath. In addition, the moving belts prevent any abrasion of the filaments which would occur if the filamentary material were forced to move relative to stationary electrodes.

Figure 2 shows a modification in which the metallic belt is replaced by an insulating belt 33, such as of glass fabric or rubber, and an upper metallic plate 34 serves as the opposite electrode in place of the metallic belt.

Figure 3 shows a sequence of processing steps for the manufacture of staple fiber for continuous filamentary material in which the artificial filaments are produced in the spinning machine 35 at the first stage and treated at 36 with liquids which depend upon the particular material being dealt with. For example, for viscose the treatment generally comprises an acid washing, desulfurizing, and soaping. The wet tow is then subjected to pre-drying at 37 by means of the radio frequency dryer just described, the partially dried tow being then subjected to crimping at 38 after which it is subjected to a final drying 39 by the radio frequency equipment just described from which it may proceed to any other device 40 such as a staple fiber cutter or the ball warper specifically mentioned in the drawing. This sequence of steps is only one example of a number of procedures possible to be employed in conjunction with the device of the invention. Instead, the crimping may be omitted in which case the dryer of the invention may be employed in a single step to reduce the moisture to the final dryness desired. The device may be constituted of a plurality of pairs of electrostatic electrodes (analogous to 24 and 25 of Figure 1 and 25 and 33 of Figure 2) spaced along the belts and operated at successively higher voltages in the direction of travel of the tow. Additional variations are possible in applying the invention to the crimping of filamentary tow, such as by the method and apparatus shown in the application of Bruenner et al., Serial No. 399,440, filed June 24, 1941, these modifications being illustrated by Figures 4 and 5 hereinafter.

As shown in Figure 4, a plurality of filamentary tows, side by side, are fed to the lower belt 41 so they extend longitudinally thereof and pass between the upper and lower belts 42 and 41 operated and arranged to effect crimping by virtue of contraction of the belts which are necessarily of an elastic character in this example. Both the upper and lower belts are preferably of rubber and may be porous to facilitate removal of vapor and gas developed between the belts by means of the high frequency current applied to the opposite electrodes 43, 45 and 44, 46 on either side of the belts. The tow enters between the two belts into the nip between a pair of rolls 47 and 48 which are pressed together and which are operated at a higher rate of speed than the next pair of rolls 49 and 50 forming the next nip between which the belts with the tow therebetween proceed so that contraction occurs between the two pairs of rolls, thus effecting crimping of the tow. While this crimping is proceeding the tow is heated by means of the high frequency electrodes 43 and 44, thus preparing the tow for rapid subsequent setting of the crimp therein. From the second pair of rolls, the tow and belts proceed to a third pair of rolls 51 and 52 which in turn rotate at a lower speed than the second pair, heating occurring as a result of a high frequency current applied to the two electrodes 45 and 46 so that the crimp is set substantially by the time it leaves the last pair of rolls. The rolls of each pair are preferably tilted out of vertical alignment as shown. The arrangement for positively driving the several pairs of rolls at the desired speed differentials are clearly shown in the drawings as constituted of suitable gears, sprockets and chains. Preferably roll 53 is driven at the same speed as rolls 47 and 48.

In Figure 5, there is shown an arrangement similar to Figure 4 except for the fact that only two pairs of pressure rolls are used in which case the rolls may be directly superimposed instead of having the nips tilted or offset as shown in Figure 4. Roll 54 is driven at the same speed as the first pair of rolls. With the crimping arrangements of Figures 4 and 5, as in Figures 1 and 2, it is preferred to operate the mechanism within a vacuum chamber.

While preferred embodiments of the invention have been shown and described, it is to be understood that changes and variations may be made without departing from the spirit and scope of the invention as defined by the appended claims.

I claim:

1. An apparatus for treating filamentary material comprising a pair of substantially parallel sheet electrodes arranged with their opposed surfaces in close juxtaposition, means for conveying the filamentary material between the electrodes, said means being arranged to effect crimping of the filamentary material as it passes between the electrodes and means for applying a high frequency electric current to said electrodes.

2. An apparatus for treating filamentary material comprising a sheet electrode, an insulating belt for conveying a layer of filamentary material over said electrode, an electrically conductive belt having a course engaging the upper surface of the layer, means for moving the adjacent courses of the belts at substantially the same velocity and means for imparting a high frequency electric current to said conductive belt and electrode.

3. An apparatus for treating filamentary material comprising a stationary sheet electrode, a vapor-permeable insulating belt for conveying a layer of filamentary material over said electrode, a second vapor-permeable insulating belt having a course engaging the upper surface of the layer, means for moving adjacent courses of the belts at substantially the same velocity, a second stationary sheet electrode arranged closely adjacent the upper surface of the course of the second belt, the electrodes being arranged generally parallel to the belts and means for imparting a high frequency electric current to said electrodes as opposite poles.

4. An apparatus for treating filamentary material comprising a chamber, means for maintaining a reduced pressure in the chamber, an insulating belt for conveying a layer of filamentary material along a path in the chamber, means for distributing the filamentary material on the belt in the form of a layer of substantially uniform thickness, a permeable belt having a course engaging the upper surface of the layer, means for moving the adjacent courses of the belts at substantially the same velocity, means for subjecting the filamentary material between the moving belts to a high frequency electric current, and entrance and exit means for the chamber provided with means for hindering passage of air therethrough, whereby the filamentary material may be introduced and removed without substantial reduction of the vacuum.

5. An apparatus for treating filamentary material comprising a chamber, means for maintaining a reduced pressure in the chamber, a stationary sheet electrode in the chamber, an insulating belt for conveying a layer of filamentary material over said electrode, an electrically conductive belt having a course engaging the upper surface of the layer, means for moving the adjacent courses of the belts at substantially the same velocity, and means for imparting a high frequency electric current to the conductive belt and the electrode as opposite poles.

6. An apparatus for treating filamentary material comprising a stationary electrode, an insulating belt of elastic material for conveying a layer of filamentary material over said electrode, a second insulating belt of elastic material having a course engaging the upper surface of the layer, means for driving the belts comprising a plurality of pairs of rolls, means for driving each succeeding pair of said rolls at a speed of rotation less than that of the preceding pair, a second stationary electrode adjacent the upper surface of the course of the second belt, and means for imparting a high frequency electric current to the electrodes as opposite poles.

7. An apparatus for treating filamentary material comprising a pair of substantially parallel sheet electrodes arranged with their opposed surfaces in close juxtaposition, means for imparting a high frequency electric current to the electrodes, vapor-permeable means comprising at least one insulating belt for continuously moving filamentary material between the electrodes, said moving means being arranged substantially parallel to and between the electrodes to protect the filamentary material from sliding engagement with the electrodes during said motion, one of said electrodes being arranged to press against said insulating belt.

8. An apparatus for treating filamentary material comprising a pair of substantially parallel sheet electrodes arranged with their opposed surfaces in close juxtaposition, means for imparting a high frequency electric current to the electrodes, means comprising at least one vapor-permeable insulating belt for continuously moving filamentary material between the electrodes, said moving means being arranged substantially parallel to and between the electrodes to protect the filamentary material from sliding engagement with the electrodes during said motion, one of said electrodes being arranged to press against said insulating belt, and means for reducing the atmospheric pressure in the vicinity of the electrodes.

9. An apparatus for treating filamentary material comprising a chamber, a pair of substantially parallel sheet electrodes arranged in the chamber with their opposed surfaces in close juxtaposition, means for imparting a high frequency electric current to the electrodes, means for reducing the atmospheric pressure to a partial vacuum in the chamber, vapor-permeable means for continuously moving filamentary material between the electrodes, means for depositing filamentary material on the moving means in a layer, and entrance and exit means for the chamber provided with means for hindering the passage of air therethrough whereby the filamentary material may be introduced and removed without substantial reduction of the vacuum.

10. An apparatus for treating filamentary material comprising a chamber, a pair of substantially parallel sheet electrodes arranged in the chamber with their opposed surfaces in close juxtaposition, means for imparting a high frequency electric current to the electrodes, means for reducing the atmospheric pressure to a partial vacuum in the chamber, vapor-permeable means for continuously moving filamentary material between the electrodes comprising belt means having at least one course arranged substantially parallel to and between the electrodes for protecting the filamentary material from sliding engagement with the electrodes during such motion, and entrance and exit means for the chamber provided with means for hindering the passage of air therethrough whereby the filamentary material may be continuously introduced and removed without substantial reduction of the vacuum.

11. An apparatus for treating filamentary material comprising a pair of substantially parallel sheet electrodes arranged with their opposed surfaces in close juxtaposition, means for imparting a high frequency electric current to the electrodes, vapor-permeable belt means comprising at least one insulating belt for continuously moving filamentary material between the electrodes, said belt means being arranged parallel to and between the electrodes to protect the filamentary material from sliding engagement with the electrodes during said motion, one of said electrodes being arranged to press against said insulating belt, and the space between the opposed surfaces of the electrodes being sufficiently close as to substantially confine the material and the belt means as they pass between the electrodes.

12. An apparatus for treating filamentary material comprising a pair of substantially parallel sheet electrodes arranged with their opposed surfaces in close juxtaposition, means for imparting a high frequency electric current to the electrodes, vapor-permeable belt means comprising at least one insulating belt for continuously moving filamentary material between the electrodes, means for depositing filamentary material on the belt means in a thin layer of substantially uniform thickness, said belt means being arranged to protect the filamentary material from sliding engagement with the electrodes during said motion, one of said electrodes being arranged to press against said insulating belt, and the space between the opposed surfaces of the electrodes being sufficiently close as to substantially confine the material and belt means as they pass between the electrodes.

13. An apparatus for treating filamentary material comprising a pair of substantially parallel sheet electrodes arranged with their opposed surfaces in close juxtaposition, means for imparting a high frequency electric current to the electrodes, vapor-permeable belt means comprising at least one permeable insulating belt for continuously moving filamentary material between the electrodes, said belt means being arranged parallel to and between the electrodes to protect the filamentary material from sliding engagement with the electrodes during said motion, one of said electrodes being arranged to press against said insulating belt, the space between the opposed surfaces of the electrodes being sufficiently close to substantially confine the material and belt means as they pass between the electrodes, and means for reducing the atmospheric pressure in the vicinity of the electrodes.

14. An apparatus for treating filamentary material comprising a chamber, a pair of substantially parallel sheet electrodes arranged in the chamber with their opposed surfaces in close juxtaposition, means for imparting a high frequency electric current to the electrodes, means for reducing the atmospheric pressure to a partial vacuum in the chamber, vapor-permeable means arranged substantially parallel to and between the electrodes for continuously conveying filamentary material between the electrodes, the space between the opposed surfaces of the electrodes being sufficiently close as to substantially confine the material with the conveying means as they pass between the electrodes, and entrance and exit means for the chamber provided with means for hindering the passage of air therethrough whereby the filamentary material may be introduced and removed without substantial reduction of the vacuum.

15. An apparatus for treating filamentary material comprising a pair of substantially parallel sheet electrodes arranged with their opposed surfaces in close juxtaposition, means for imparting a high frequency electric current to the electrodes, vapor-permeable belt means comprising at least one insulating belt for continuously moving filamentary material between the electrodes, means for depositing filamentary material on the belt means in a thin layer of substantially uniform thickness, said belt means being arranged to protect the filamentary material from sliding engagement with the electrodes during said motion, and the space between the opposed surfaces of the electrodes being sufficiently close as to substantially confine the material and belt means as they pass between the electrodes.

CAMIEL DE BRABANDER.